(No Model.) 3 Sheets—Sheet 1.
R. ANSELL.
CAN OR BOX-HEAD CRIMPING MACHINE.
No. 537,174. Patented Apr. 9, 1895.
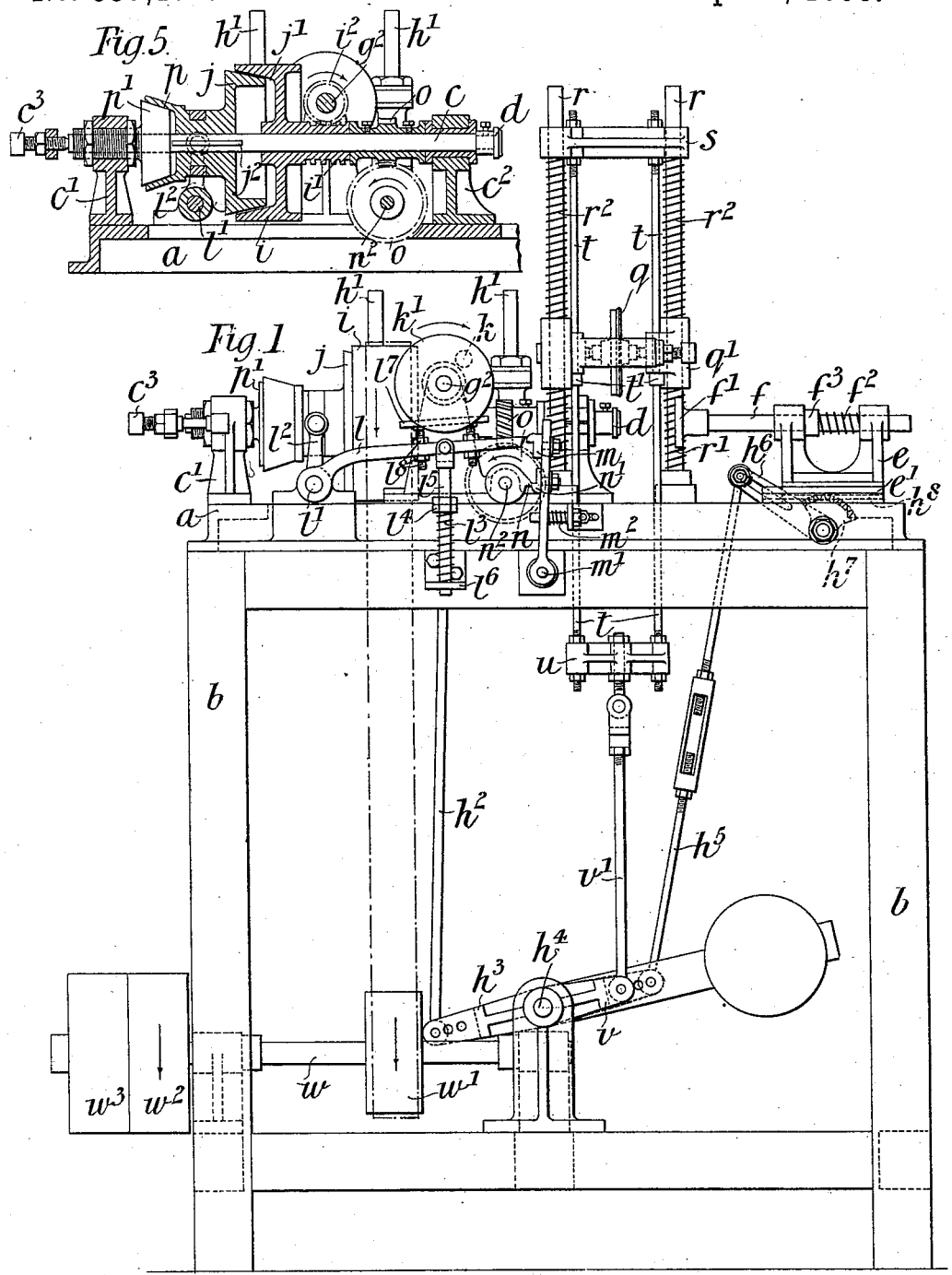
Witnesses.
Inventor.
THE NORRIS PETERS CO., PHOTO-LITHO., WASHINGTON, D. C.

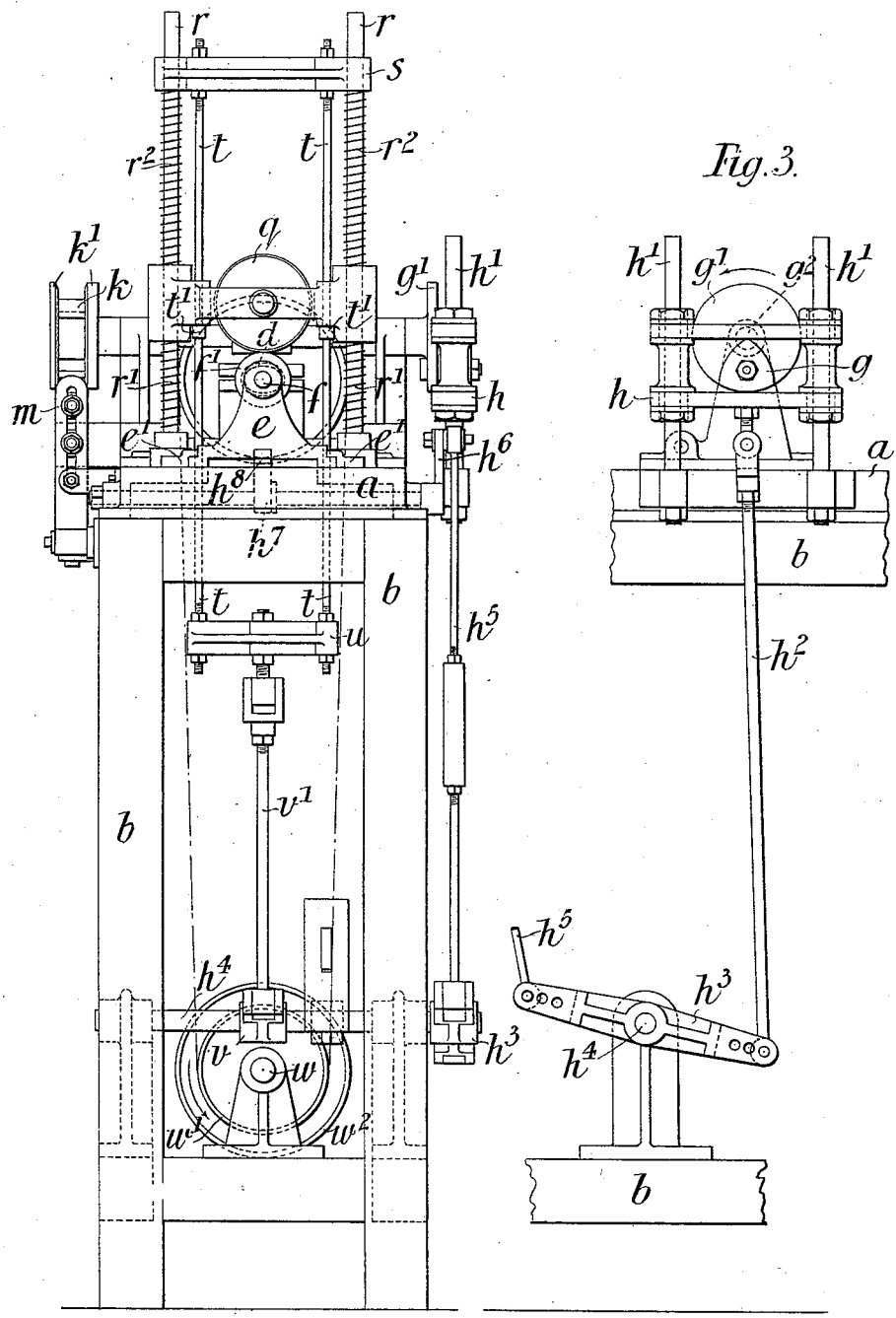

(No Model.) 3 Sheets—Sheet 3.
R. ANSELL.
CAN OR BOX HEAD CRIMPING MACHINE.
No. 537,174. Patented Apr. 9, 1895.
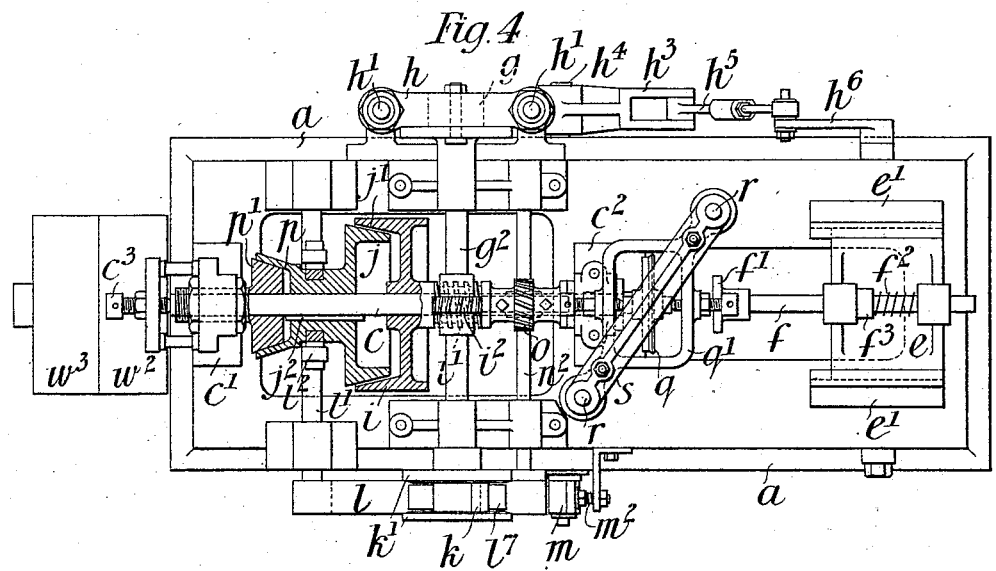
Fig. 4.
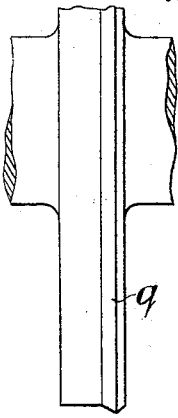
Fig. 6.
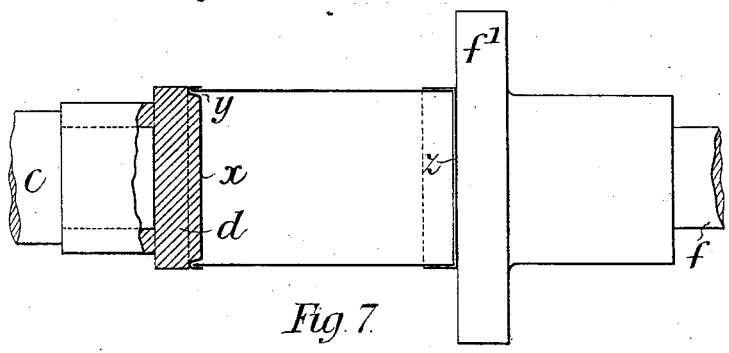
Fig. 7.
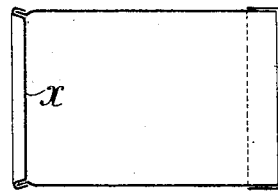
Witnesses. Inventor.
G. F. Redfern. R. Ansell
A. Abbott

UNITED STATES PATENT OFFICE.

RENVILLE ANSELL, OF CROYDON, ENGLAND.

CAN OR BOX HEAD CRIMPING MACHINE.

SPECIFICATION forming part of Letters Patent No. 537,174, dated April 9, 1895.

Application filed September 27, 1894. Serial No. 524,243. (No model.) Patented in England February 22, 1892, No. 3,407.

*To all whom it may concern:*

Be it known that I, RENVILLE ANSELL, a subject of the Queen of Great Britain, residing at Croydon, in the county of Surrey, England, have invented new and useful Improvements in Can or Box Head Crimping Machines, (the said invention having been partly covered by Letters Patent of Great Britain No. 3,407, dated February 22, 1892,) of which the following is a specification.

This invention relates to improvements in machinery or apparatus for "rolling on" the bottoms of tin boxes, cans, canisters and the like whereby the said bottoms are attached to the bodies in a better and more speedy manner than hitherto by rendering the working of the machine automatic as hereinafter more particularly described.

In carrying out my invention on a suitable bed plate I mount two headstocks, the spindle of the fixed headstock having a chuck or face plate adapted to carry the flanged bottom of the box or the like. The spindle of the puppet head carries a spring or yielding gripping plate for the purpose hereinafter described and the puppet head is arranged to be automatically moved forward and backward by means of a rack and toothed segment operated from a pulley on the headstock spindle by a cam driven by a worm and worm wheel and suitable connecting rods and levers.

The chuck or face plate is arranged to be revolved intermittently from the driving pulley by means of a cone clutch adapted to engage with a conical recess in the pulley and working on a spline on the headstock spindle so that when the chuck has completed, say, two revolutions, sufficient to complete the "rolling on" operation, the clutch is put out of gear with the driving pulley.

The mechanism for operating the clutch comprises a cam arranged on the shaft of the aforesaid cam and adapted to move a spring lever connected to the clutch so as to move the latter into gear with the driving pulley, the lever being held in this position by a spring catch, the clutch being moved out of gear by means of a cam operated from the headstock spindle by spiral gearing, which cam impinges against a tooth or projection on the spring catch and releases the lever.

In order that the chuck or face plate shall stop when the clutch is put out of gear with the driving pulley I provide the clutch with a conical recess designed to engage a fixed cone.

Above the chuck or face plate is arranged what I term a "rolling on" plate the edge of the said plate being shaped to correspond with the edge of the chuck or face plate. The said "rolling on" plate is carried by a crosshead sliding upon uprights fixed to the bed plate and springs are placed between the under side of the said crosshead and the bed plate and between the upper side of the crosshead and another crosshead sliding on the said uprights and connected by rods to a lever operated by the cam first referred to.

To enable my invention to be fully understood I will describe how it can be carried into practice by reference to the accompanying drawings, in which—

Figure 1 is a side elevation of my improved machine for "rolling on" the bottoms of tin boxes, cans, canisters and the like. Fig. 2 is an end elevation of the same. Fig. 3 is an elevation of a part of the machine looking from the opposite side to that shown in Fig. 1. Fig. 4 is a plan of the machine partly in section. Fig. 5 is a longitudinal section showing clearly the driving spindle and parts connected therewith. Fig. 6 is a sectional elevation of part of the machine drawn to an enlarged scale showing a box in position for being operated upon, the devices for holding and rotating the box and the rolling-on plate. Fig. 7 is a section of the box with the bottom "rolled on."

$a$ is the bed plate fixed on a stand or bench $b$.

$c$ is the spindle mounted in the headstock $c'$, $c^2$ and carrying the chuck or face plate $d$ shaped on the edge as shown clearly in Fig. 6 to adapt it to receive the flange on the edge of the bottom of the box or the like.

$c^3$ is an adjustable screw at the rear of the spindle $c$ for minimizing and taking up any endwise wear due to pressure upon the face of the chuck $d$ when the "rolling on" operation is being performed.

$e$ is the movable headstock or puppet head which slides in guides $e'$, $e'$ on the bed plate $a$ and $f$ is the spindle thereof carrying the gripping plate $f'$ and provided with a spring $f^2$ arranged between a collar $f^3$ on the said spindle and one of the bearings of the puppet head.

$g$ Fig. 3 is the cam for communicating the forward and backward movement to the puppet head the said cam being fixed to a disk $g'$ on a shaft $g^2$ and serving to operate the puppet head through the medium of the frame $h$ sliding on guides $h'$, the rod $h^2$, the lever $h^3$ attached to a shaft $h^4$, the rod $h^5$, the lever $h^6$, and the toothed segment $h^7$ engaging with the rack $h^8$ on the puppet head.

$i$ is the driving pulley loose on the spindle $c$ and provided with the worm $i'$ for the purpose of driving the cam $g$ through the medium of the worm wheel $i^2$ on the shaft $g^2$.

$j$ is the cone clutch for intermittently revolving the chuck $d$ and $j'$ is the recess in the pulley $i$ with which the clutch engages, the latter sliding upon the spindle $c$ and serving to drive the same by means of the spline $j^2$.

$k$ is the cam for causing the clutch $j$ to engage with the recess $j'$ the said cam being in the form of a pin carried between two disks $k'$, $k'$ mounted on the shaft $g^2$ and operating the clutch through the medium of the lever $l$, shaft $l'$ and clutch fork $l^2$.

$l^3$ is a spring for returning the lever $l$ after being forced down by the cam $k$ the said spring being arranged between a collar $l^4$ on a rod $l^5$ connected to the said lever and a guide $l^6$ through which the said rod works.

$l^7$ is a plate adjustable upon the lever $l$ by means of the screws and nuts $l^8$, $l^8$ against which plate the cam $k$ impinges.

$m$ is the catch for holding the lever $l$ when moved by the cam $k$, the said catch being pivoted at $m'$ and provided with the spring $m^2$.

$n$ is the cam for releasing the lever $l$ by impinging against a tooth $n'$ on the catch $m$ the cam $n$ being mounted on a shaft $n^2$ and operated from the spindle $c$ by the spiral wheels $o$, $o$.

$p$ is the conical recess in the clutch $j$ and $p'$ the fixed cone with which the said recess engages when the clutch is disengaged from the pulley $i$, a tubular shank on the said cone serving as a bush for the spindle $c$ in the bearing $c'$ of the fixed headstock.

$q$ is the "rolling on" plate the edge of which is shaped as shown clearly in Fig. 6 to correspond with the edge of the chuck or face plate $d$.

$q'$ is the crosshead carrying the "rolling on" plate $q$, the said crosshead sliding on the uprights $r$, $r$ fixed to the bed plate $a$.

$r'$, $r'$ are the springs placed between the crosshead $q'$ and the bed plate $a$, and $r^2$, $r^2$ are the springs between the crosshead $q'$ and the crosshead $s$ also sliding on the uprights $r$, $r$.

$t$, $t$ are the rods connecting the crosshead $s$ to a crosshead $u$ beneath the bed plate $a$ and provided with collars $t'$, $t'$ for the purpose hereinafter described, and $v$ is the lever to which the said crosshead is connected by the rod $v'$, the said lever being mounted on the shaft $h^4$ operated by the cam $g$.

$w$ is a shaft arranged at the lower part of the bench $b$ and carrying a pulley $w'$, designed to drive the pulley $i$, and fast and loose pulleys $w^2$, $w^3$.

Assuming the parts of the machine to be in the position indicated in the drawings, that is to say, the clutch $j$ disengaged from the pulley $i$ so that the chuck $d$ is stationary, the puppet head $e$ in its extreme outward position and the "rolling on" plate $q$ in its highest position then the machine being started the operation is as follows: The bottom $x$ of the box (the edge of which is, as shown in Fig. 6, doubled or folded outward to form a trough $y$ to receive the edge of the bottom end of the box as usual) is placed upon the chuck or face plate $d$ and the edge of the bottom end of the box is held in the said trough $y$, the lid $z$ being first placed upon the box. The cam $g$ in moving in the direction of the arrow Fig. 3 will cause the frame $h$ to move upward and move forward the puppet head $e$ so as to press the gripping plate $f'$ against the lid $z$ of the box and maintain the edge of the bottom end of the box in the trough $y$ in the bottom $x$ the pressure of the gripping plate $f'$ being limited by the spring $f^2$. The "rolling on" plate $q$ will at the same time be moved downward against the pressure of the springs $r'$ (through the downward movement of the cross-head $s$ compressing the springs $r^2$) so as to bring its edge against the turned up portion of the box bottom and the clutch $j$ will be put in gear with the pulley $i$ by reason of the cam $k$ impinging against the plate $l^7$ on the lever $l$ whereby the spindle $c$ will be revolved and rotate the box, the two sides of the troughed portion of the bottom $x$ being pressed by the action of the "rolling on" plate $q$ and the chuck or face plate $d$ against the edge of the bottom end of the box so as to securely fix on the bottom and make a good and tight joint as shown by the sectional view of the box in Fig. 7. The clutch $j$ is held in gear with the pulley $i$ while the chuck or face plate $d$ makes a certain number of revolutions (in practice I find two revolutions to be sufficient) this being effected by the spring catch $m$ engaging with the end of the lever $l$ when depressed by the cam $k$ the cam $n$ first moving out of the way of the tooth $n'$ on the spring catch. When the two revolutions of the chuck $d$ are effected the cam $n$ impinges against the tooth $n'$ and forces back the catch $m$ whereby the lever $l$ moves up under the action of the spring $l^3$ and puts the clutch $j$ out of gear with the pulley $i$ the recess $p$ in the clutch at the same time engaging with the cone $p'$ and stopping the chuck $d$. The cam $g$ then moves down the frame $h$ thereby moving back the puppet head $e$ to its normal position and releasing the box and lifting the rods $t, t$ whereby the collars $t', t'$ lift the cross-head $q'$ carrying the "rolling on" plate into its normal position. The use of the springs $r^2$ enables the "rolling on" plate to yield or accommodate itself to square, oval or other shaped boxes or the like.

By the employment of a cam such as $g$ and the arrangement of the cam $k$, the lever $l$, catch $m$ and cam $n$ the continued rotation of the pulley $i$ produces an automatic intermittent action of the puppet head $e$, crosshead $q'$ and chuck or face plate $d$, that is to say, an interval of time elapses between the two former being moved back into their normal positions and again being moved forward to their operative positions and between each two revolutions of the latter, this interval allowing another box and bottom to be placed in position, the machine again operating as before and so on.

Having now particularly described and ascertained the nature of my said invention and in what manner the same is to be performed, I declare that what I claim is—

1. In a can making machine the combination with the gripping plate, of the chuck and its spindle, a loose pulley mounted on said spindle, a clutch for operatively connecting the pulley and spindle and means for locking the clutch and spindle for joint movement, substantially as described.

2. In a can making machine the combination with the gripping plate, of the chuck and its spindle, a loose pulley mounted on said spindle, a clutch for operatively connecting said pulley and spindle, means for locking the clutch and spindle for joint movement and a device operated by the spindle for releasing said locking means, substantially as described.

3. In a can making machine the combination with the gripping plate, of the revolving stationary chuck and its spindle, a pulley loosely mounted on said spindle, a clutch for coupling the spindle and pulley and means operatively connected with said pulley for forcing the clutch into engagement therewith, substantially as described.

4. In a can making machine the combination with the gripping plate, of the revolving stationary chuck and its spindle, a pulley loosely mounted on said spindle, a clutch for coupling said spindle and pulley, means operatively connected with said pulley for forcing the said clutch into engagement therewith, a locking device for said clutch and a device operated by the spindle for releasing said locking device, substantially as described.

5. In a can making machine the combination with the revolving stationary chuck and its spindle, of a pulley loosely mounted on said spindle, a clutch for coupling the spindle and pulley, the movable gripping plate, the movable rolling-on plate, and devices operatively connected with the said pulley for automatically and intermittently operating said gripping plate, rolling-on plate and clutch, substantially as described.

6. In a can making machine the combination with the stationary revolving chuck, and its spindle, of a pulley loosely mounted on said spindle, a clutch for coupling the spindle and pulley, the movable gripping plate, the movable rolling-on plate, a cam shaft operatively connected with said pulley, cams on said shaft for intermittently operating the gripping plate, the rolling-on plate and said clutch, substantially as described.

In witness whereof I, the said RENVILLE ANSELL, have hereunto set my hand this 19th day of September, 1894.

RENVILLE ANSELL.

Witnesses:
G. F. REDFERN,
A. ALBUTT.